United States Patent
Palmer et al.

(10) Patent No.: US 6,810,435 B2
(45) Date of Patent: Oct. 26, 2004

(54) PROGRAMMABLE IDENTIFICATION IN A COMMUNICATIONS CONTROLLER

(75) Inventors: Mark Palmer, Phoenix, AZ (US); Steven Eric Schlanger, Flagstaff, AZ (US)

(73) Assignees: Microchip Technology Incorporated, Chandler, AZ (US); Aegis Technologies, L.L.C., Flagstaff, AZ (US)

( * ) Notice: Subject to any disclaimer, the term of this patent is extended or adjusted under 35 U.S.C. 154(b) by 639 days.

(21) Appl. No.: 09/866,991

(22) Filed: May 29, 2001

(65) Prior Publication Data

US 2003/0016419 A1 Jan. 23, 2003

(51) Int. Cl.$^7$ .................................................. G06F 3/00
(52) U.S. Cl. ................................ 710/8; 710/15; 710/21; 710/36
(58) Field of Search ............................... 710/8, 10, 11, 710/14, 21, 36

(56) References Cited

U.S. PATENT DOCUMENTS

| | | | | |
|---|---|---|---|---|
| 5,444,439 A | * | 8/1995 | Kuroda et al. | 340/825.22 |
| 5,734,487 A | * | 3/1998 | Rossi | 398/115 |
| 5,812,293 A | * | 9/1998 | Yen | 398/115 |
| 5,850,304 A | * | 12/1998 | Elmers et al. | 398/107 |

* cited by examiner

*Primary Examiner*—Jeffrey Gaffin
*Assistant Examiner*—Alan Chen
(74) *Attorney, Agent, or Firm*—Baker Botts L.L.P.

(57) ABSTRACT

A communications controller may be programmed to store an identification code (identification data string) for a produce device in a non-volatile read/write memory, e.g., an electrically erasable programmable read only memory (EEPROM), FLASH memory, etc. The identification string may be generic or unique for the device and may be programmed before, during or after manufacture of the device. In addition, the identification string may be reprogrammed whenever a change is made to the device, e.g., after an upgrade.

4 Claims, 4 Drawing Sheets

PROGRAMMABLE IDENTIFICATION IN A COMMUNICATIONS CONTROLLER

FIELD OF THE INVENTION

The present invention relates generally to communication controllers, and more particularly to an integrated circuit (IC) communication protocol controller having an identification data string which may be changed without disturbing other programmed functions from a generic identification data string to a unique identification data string customized for a specific purpose.

BACKGROUND OF THE INVENTION TECHNOLOGY

Communications controllers may be used whenever two or more separate devices must communicate together by using a certain communications protocol. Generally, data is transferred (sent and received) between the two or more separate devices by sequential digital signals, e.g., serially transmitted digital packets. Numerous communications protocol are being used for both wired and wireless communications links between the two or more devices, e.g., USB, IEEE 1451, J-1850, DALI, LIN, ethernet, and wireless standards such as radio frequency, e.g., Bluetooth, and infrared transmission, e.g., IrDA.

For example, but not limited to, wireless communications links such as infrared (IR) between two or more devices require a robust communications protocol. The devices at each end of an IR link may move freely within range and out of range. The IR link may be broken in the middle of a transmission, or may suffer interference from external light sources. The Infrared Data Association (IrDA) is an organization which promotes an IR standard for interoperability of wireless IR links between various manufacturers devices. The IRDA defines a set of specifications, or protocol stack, that provides for the establishment and maintenance of an IR link so that error free communication is possible. The IrDA Standard includes three mandatory specifications: the Physical Layer, Link Access Protocol (IrLAP), and Link Management Protocol (IrLMP). The first version of the IrDA specification, Version 1.0, provided for communication at data rates up to 115.2 Kb/s. Version 1.1 extended the data rates up to 4 Mb/s, while maintaining backward compatibility with Version 1.0 compliant products. All IrDA Specifications are incorporated by reference herein for all purposes.

When two IrDA compliant devices establish a connection the process is analogous to connecting two devices with serial ports using a cable. An IRDA connection is limited to half-duplex operation because the infrared transmitter and receiver (transceiver) cannot transmit and receive at the same time.

Whenever two IrDA devices come within optical infrared range, they have to recognize each other. The objective is that one IRDA device has some task to accomplish and the other IrDA device has a resource needed to accomplish this task. For example, when an IrDA equipped laptop computer needs to print a document the laptop computer will be brought within optical range of an IrDA equipped printer. In this case the laptop computer has a task to be performed (print a document) and the printer has the resource to perform the task. The laptop computer is the primary IRDA device and the printer is the secondary IrDA device.

Wired communications links (network) also must provide robust and secure data transfer between devices. Typically devices communicating over wired and/or wireless communications links have different purposes, e.g., printers, camera, keyboard, disk storage, etc. Different brands and models of devices are also frequently found on the communication links. It would be advantageous to be able to easily and rapidly identify characteristics and capabilities of these devices.

What is needed are cost effective and easy to implement ways of associating device identification data strings with respective devices and supplying the necessary logic circuits therefor.

SUMMARY OF THE INVENTION

The invention overcomes the above-identified problems as well as other shortcomings and deficiencies of existing technologies by providing hardware and software methods, system and apparatus for programming and supplying an identification code (identification data string) for any wired or wireless connected devices. According to an exemplary embodiment of the invention, a device comprises a communications controller adapted for the type of wired or wireless communications link that the device is functionally in data communications therewith. The communications controller further comprises a programmable non-volatile memory, e.g., an electrically erasable programmable read only memory (EEPROM), flash memory, etc. A unique identification data string may be programmed into the EEPROM before manufacture of the device or a standard generic pre-programmed identification string may be initially programmed and then the unique identification string may be programmed into the EEPROM at a later time.

In another exemplary embodiment, an IrDA compliant communications controller having an IrDA protocol stack and a non-volatile memory that may be programmed with a generic or unique identification data string before assembly into an IrDA compliant system, or may be programmed with the unique identification data string after assembly and integration in the IrDA compliant system. The non-volatile memory of the IrDA communications controller may be adapted to store a generic identification string at the time of manufacture. This generic identification string may be used without modification or may be easily changed either before or after assembly of the IrDA communications controller into the IrDA compliant system.

In addition, it is contemplated and within the scope of the present invention that the identification data string may be changed (upgraded) whenever an upgrade is made to the associated device. According to an exemplary embodiment of the invention, the identification string may be stored in user accessible read/write non-volatile memory locations.

The communications controller may be for example, but not limited to, a microcontroller, a microprocessor, a programmable logic array (PLA), an application specific integrated circuit (ASIC), digital logic and the like.

In accordance with an exemplary embodiment of the present invention, an apparatus for storing an identification data string used in identifying characteristic of a device in a communications circuit comprising a communications controller adapted for connection to a device and a communications circuit and a programmable non-volatile memory for storing an identification data string representative of the capabilities of the device. The programmable non-volatile memory may be an electrically erasable and programmable read only memory (EEPROM). The programmable non-volatile memory may also be a programmable flash memory. The communications controller may generate a serial clock rate. The communications circuit may be wireless. The wireless communications circuit may be infrared, Bluetooth or IRDA. The communications circuit may be wired. The wired communications circuit may be ethernet, USB, firewire, DALI, LIN, J-1850 or IEEE-1451.9. Serial data may be transmitted from a UART and serial data may be received by the UART. The programmable non-volatile memory may be programmed with a first identification data string that is generic, and may be adapted to be programmed with a second identification data string that is associated with specific capabilities of the device. The communications controller may comprise a microcontroller, a microprocessor, digital signal processor, a programmable logic array or an application specific integrated circuit.

The present invention is also directed to a method for storing an identification data string used in identifying characteristic of a device in a communications circuit comprising the steps of providing a communications controller adapted for connection to a device and a communications circuit, providing a programmable non-volatile memory and storing an identification data string representative of the device capabilities. The method further comprising the steps of transmitting serial data with a UART and receiving serial data with the UART. A portion of the transmitted serial data is the identification data string.

In addition, the present invention is directed to a system for communications between two or more devices, wherein first device application logic is adapted for sending transmit serial data at a serial clock rate and receiving receive serial data at the serial clock rate. A first communications controller is coupled to said first device application logic, said first communications controller encoding the transmit serial data and decoding the receive serial data on a communication circuit. Second device application logic adapted for receiving the transmit serial data at the serial clock rate and transmitting the receive serial data at the serial clock rate. A second communications controller coupled to said second device application logic, said communications controller decoding the transmit serial data and encoding the receive serial data on the communication circuit. Said first and second communications controllers having a first programmable non-volatile memory for storing a first identification data string representative of the capabilities of the first device, said second communications controllers having a second programmable non-volatile memory for storing a second identification data string representative of the capabilities of the second device. Such that the first and second identification data strings are transmitted and received between the first and second devices over the communications circuit. A first infrared transmitter and first encoder may be coupled to said first communications controller, wherein said first infrared transmitter and first encoder convert first transmit pulses from said first communications controller into first infrared light pulses A second infrared transmitter and second encoder may be coupled to said second communications controller, wherein said second infrared transmitter and second encoder convert second transmit pulses from said second communications controller into second infrared light pulses. A first infrared receiver is adapted for receiving the second infrared light pulses and converting the second infrared light pulses into first receive pulses. A second infrared receiver is adapted for receiving the first infrared light pulses and converting the first infrared light pulses into second receive pulses. The first infrared receiver is coupled to said first communications controller. Said second infrared receiver is coupled to said second communications controller. The first and second device application logic are selected from the group consisting of a microcontroller, a microprocessor, digital signal processor, a programmable logic array and an application specific integrated circuit. The first and second device application logic comprises a central processing unit, a random access memory and a read only memory.

A technical advantage of the present invention is a single infrared encoder/decoder that may be used for different applications and with different devices.

Another technical advantage is a unique identification string may be easily programmed into a non-volatile memory of an IrDA compliant device.

A feature of the present invention is flexibility in the application of a single design of an encoder/decoder for many different IrDA compliant devices.

Another feature is easily changing an identification string that indicates the type of IrDA device.

Features and advantages of the invention will be apparent from the following description of the embodiments, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawing, wherein.

Figure 1:
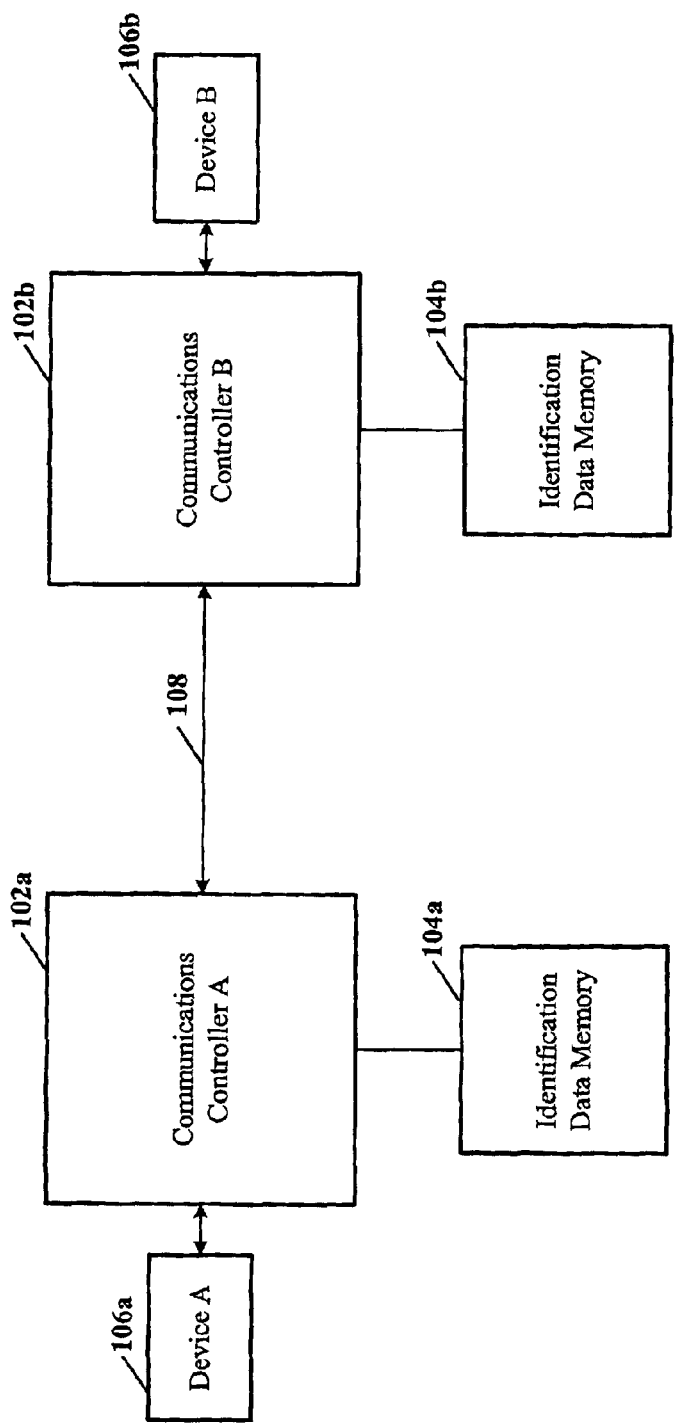
FIG. 1 illustrates a schematic functional block diagram of an exemplary embodiment of the present invention.

While the present invention is susceptible to various modifications and alternative forms, specific exemplary embodiments thereof have been shown by way of example in the drawing and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The present invention is directed to a method, system and apparatus for programming and supplying a unique identification data string in combination with a communications controller. In an exemplary embodiment of the invention, an IrDA compliant communications controller is adapted for storing an identification string in an electrically erasable and programmable read only memory (EEPROM). The communications controller may have an initial generic identification string programmed at the time of manufacture and may subsequently, either before or after shipment from the place of manufacture, have a more specific (unique) identification string programmed so as to more readily and fully identify the IRDA compliant device type, features and other parameters unique to that device in which the communications controller is integrated. It is contemplated and within the scope of the present invention that a unique identification data string may be used in combination with communications controllers adapted for any type of wired or wireless communications protocol.

Referring now to the drawing, the details of an exemplary embodiment of the present invention are schematically illustrated. Like elements in the drawing will be represented by like numbers, and similar elements will be represented by like numbers with a different lower case letter suffix.

Referring to FIG. 1, depicted is a schematic functional block diagram of an exemplary embodiment of the present invention. A communications controller 102 in combination with an identification data memory 104 provides a device 106 with a unique identification data string. A plurality of devices 106a and 106b may be in communications through associated communications controllers 102a and 102b, respectively, over a data communications link 108. The data communications link 108 may be either a wired communications circuit, e.g., Ethernet, USB, DALI, LIN, J-1850, IEEE-1451, Firewire, etc., or a wireless communications circuit, e.g., IrDA, Bluetooth, etc. For each of the communications controllers 102a and 102b, an associated identification memory 104a and 104b, respectively, may store either a generic or unique identification data string for each of the devices 106a and 106b, respectively. The identification data string (generic or unique) may be easily programmed at any time before, during or after manufacture of the device.

Figure 2:
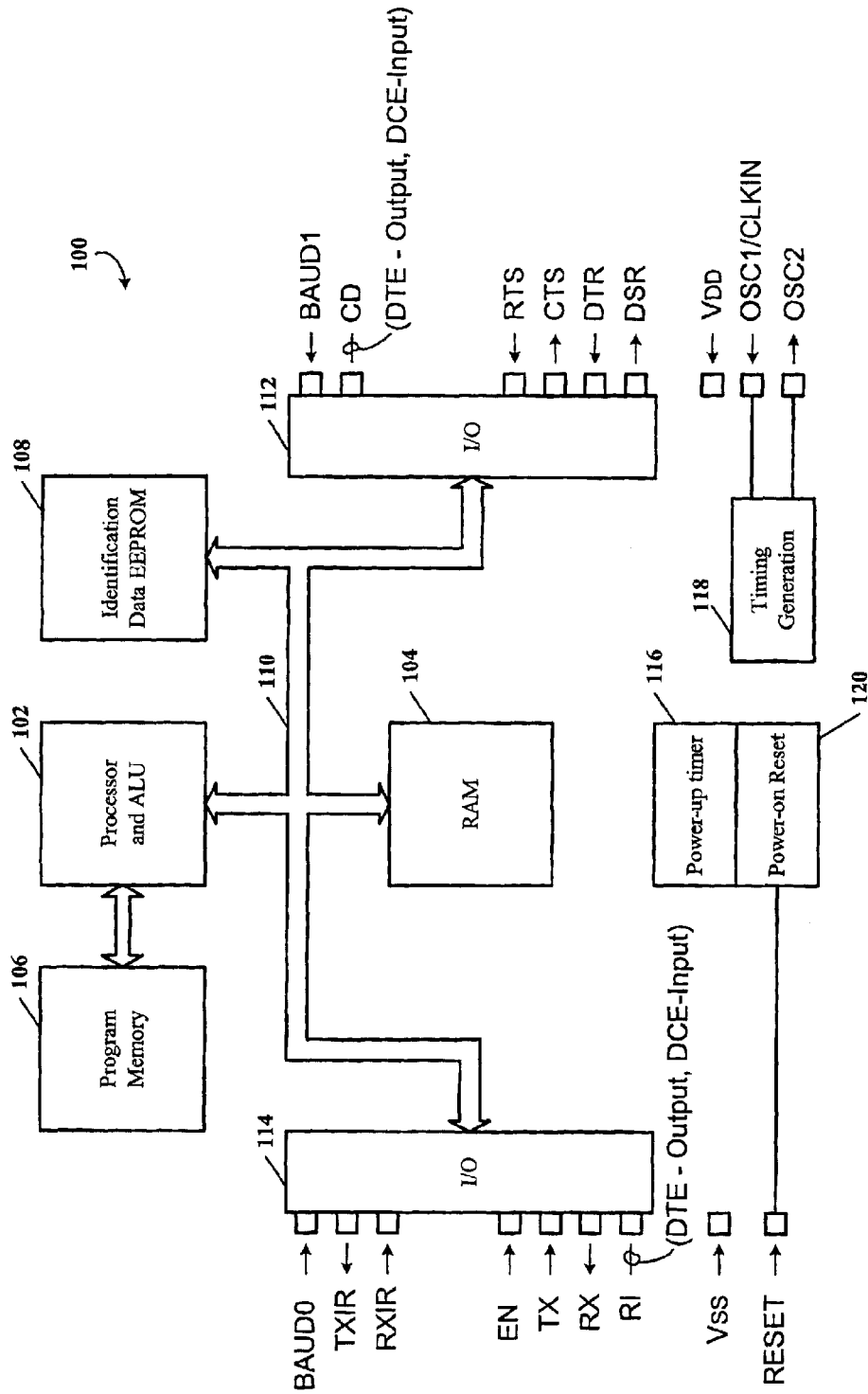
FIG. 2 illustrates a schematic block diagram of an IrDA compliant communications controller adapted for a storing a programmable identification string according to the exemplary embodiment of the invention.

Referring to FIG. 2, depicted is a schematic block diagram of an IrDA compliant communications controller adapted for a storing a programmable identification string according to an exemplary embodiment of the invention. The IrDA compliant communications controller is generally represented by the numeral 102 and comprises a processor and arithmetic logic unit (ALU) 206, a random access memory (RAM) 208, a program memory 210, an identification data electrically erasable and programmable read only memory (EEPROM) 204, a data and address bus 212, a first port input-output (I/O) 214, a second port input-output (I/O) 216, a power-up timer 218, a timing generator 220 and a power-on reset 222. The processor and ALU 206 are controlled by software instructions stored in the program memory 210. The program memory 210 may be on a separate bus 224 than the data and address bus 212. The I/O ports 214 and 216 are adapted for receiving and sending signals to and from the communications controller 102. The identification data EEPROM 204 is adapted for storing IrDA device information that may be unique to the IrDA compliant system in which the encoder/decoder 100 is embedded. The identification data EEPROM 204 may be programmed and reprogrammed at any time with the specific identification string for the IrDA device. The EEPROM 204 may be any type of programmable non-volatile memory see FIG. 1 memory 104), e.g., flash, etc.

The communications controller 102 may be adapted for Data Terminal Equipment (DTE) or for Data Communication Equipment (DCE). Functional operation of the signals at the I/O ports 214 and 216 are more fully described in Table 1 for DTE and Table 2 for DCE.

TABLE 1

(DTE)

| PIN NAME | PIN TYPE | BUFFER TYPE | DESCRIPTION |
|---|---|---|---|
| BAUD0 | I | ST | BAUD1:BAUD0 specifies the Baud rate of the device. |
| TXIR | O | — | Asynchronous transmit to IrDA transceiver |
| RXIR | I | ST | Asynchronous receive from IrDA transceiver |
| RESET | I | ST | Resets the Device |
| $V_{SS}$ | — | P | Ground reference for logic and I/O Pins |
| EN | I | TTL | Device Enable. May be used in low power and sleep modes |
| TX | I | TTL | Asynchronous receive; from Host Controller UART |
| RX | O | — | Asynchronous transmit; to Host Controller UART |
| RI | O | — | Ring Indicator. The value on this pin is driven high. |
| DSR | O | — | Data Set Ready. Indicates that the host controller has completed reset. |
| DTR | I | TTL | Data Terminal Ready. The value on this pin is ignored. |
| CTS | O | — | Clear to Send. Indicates that the host controller is ready to receive data. |
| RTS | I | TTL | Request to Send. Indicates that a Host Controller is ready to receive, and that the host controller must prepare send data if available. |
| $V_{DD}$ | — | P | Positive supply for logic and I/O pins |
| OSC2 | O | — | Oscillator crystal Output |
| OSC1/CLKIN | I | CMOS | Oscillator crystal input/external clock source input |
| CD | O | — | Carrier Detect. Indicates that the host controller has established a valid IrDA link with a Primary Device. |
| BAUD1 | I | ST | BAUD1:BAUD0 specify the Baud rate of the device. |

TABLE 2

(DCE)

| PIN NAME | PIN TYPE | BUFFER TYPE | DESCRIPTION |
|---|---|---|---|
| BAUD0 | I | ST | BAUD1:BAUD0 specify the Baud rate of the device. |
| TXIR | O | — | Asynchronous transmit to IrDA transceiver |
| RXIR | I | ST | Asynchronous receive from IrDA transceiver |
| RESET | I | ST | Resets the Device |
| $V_{SS}$ | — | P | Ground reference for logic and I/O Pins |
| EN | I | TTL | Device Enable. May be used in low power and sleep modes |
| TX | I | TTL | Asynchronous receive; from Host Controller UART |
| RX | O | — | Asynchronous transmit; to Host Controller UART |
| RI | I | TTL | Ring Indicator. The status of this bit is passed back to the IrDA Primary Device. |
| DSR | O | — | Data Set Ready. Indicates that the host controller has established a valid IrDA link with a Primary Device.[2] |
| DTR | I | TTL | Data Terminal Ready. The status of this bit is passed back to the IrDA Primary Device. |
| CTS | O | — | Clear to Send. Indicates that the host controller is ready to receive data. |
| RTS | I | TTL | Request to Send. Indicates that a Host Controller is ready to receive, and that the host controller must prepare send data is available. |

TABLE 2-continued (DCE)

| PIN NAME | PIN TYPE | BUFFER TYPE | DESCRIPTION |
|---|---|---|---|
| $V_{DD}$ | — | P | Positive supply for logic and I/O pins |
| OSC2 | O | — | Oscillator crystal Output |
| OSC1/ CLKIN | I | CMOS | Oscillator crystal input/external clock source input |
| CD | I | ST | Carrier Detect. The status of this bit is passed back to the IrDA Primary Device. |
| BAUD1 | I | ST | BAUD1:BAUD0 specify the Baud rate of the device. |

Figure 3:
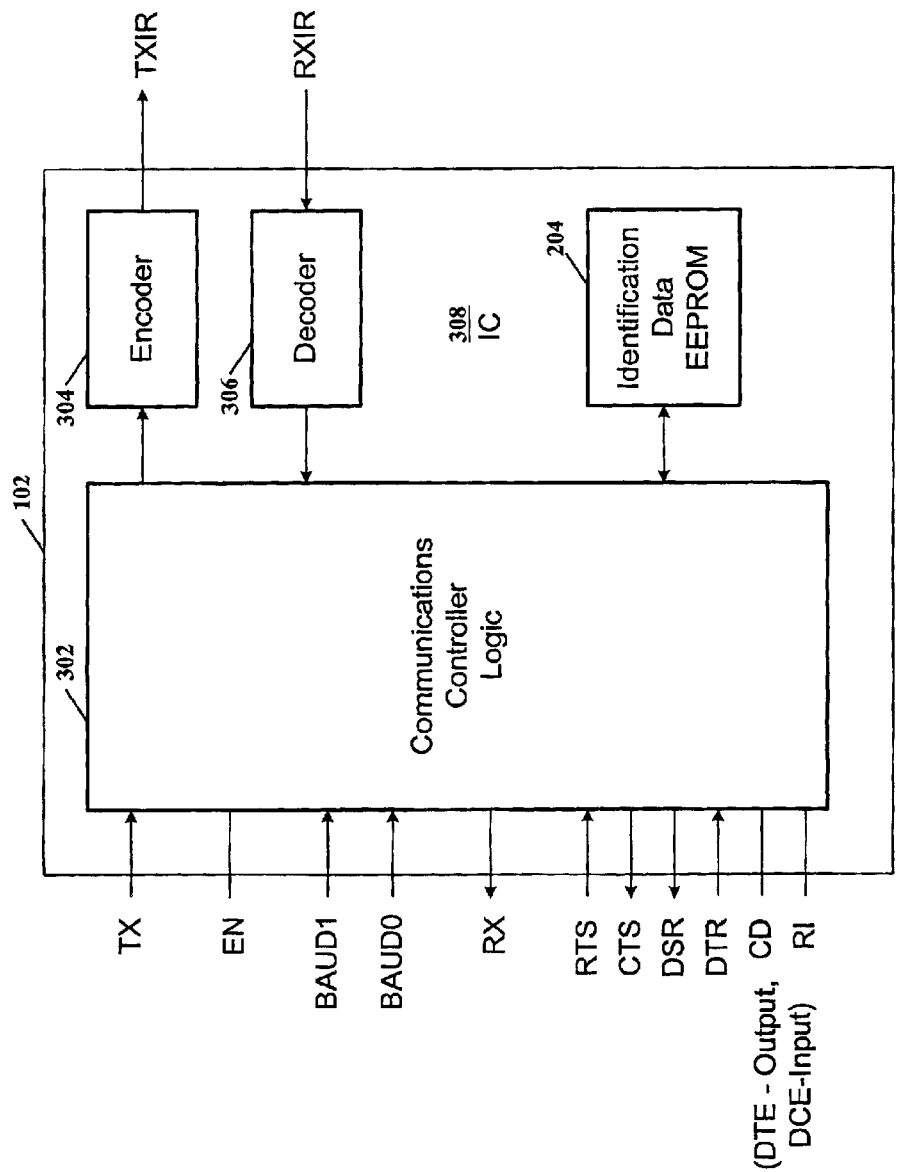
FIG. 3 illustrates a schematic functional block diagram of the encoder/decoder depicted in FIG. 2.

Legend:
TTL = TTL compatible input
I = Input
P = Power
ST = Schmitt Trigger input with CMOS levels
O = Output
CMOS = CMOS compatible input Referring now to FIG. 3, a schematic functional block diagram of the communications controller 102 depicted in FIG. 2 is illustrated. The communications controller 102 functionally comprises communications controller logic 302, an encoder 304, a decoder 306 and the identification data EEPROM 204. The encoder 304 and decoder 306 may comprise a combination of hardware logic and software program instructions. The exemplary embodiment of the communications controller 102 may be fabricated on a semiconductor integrated circuit 308.

The identification data EEPROM 204 is adapted to store the identification string for the IrDA compliant device. The EEPROM 204 may be programmed at any time for a unique identification string. Initially a generic identification string may be programmed, but once the intended IrDA compliant device is know, or when the communications controller 102 is embedded in a specific IrDA compliant device, the identification string may be easily programmed in the EEPROM 204 with the desired unique identification information.

Figure 4:
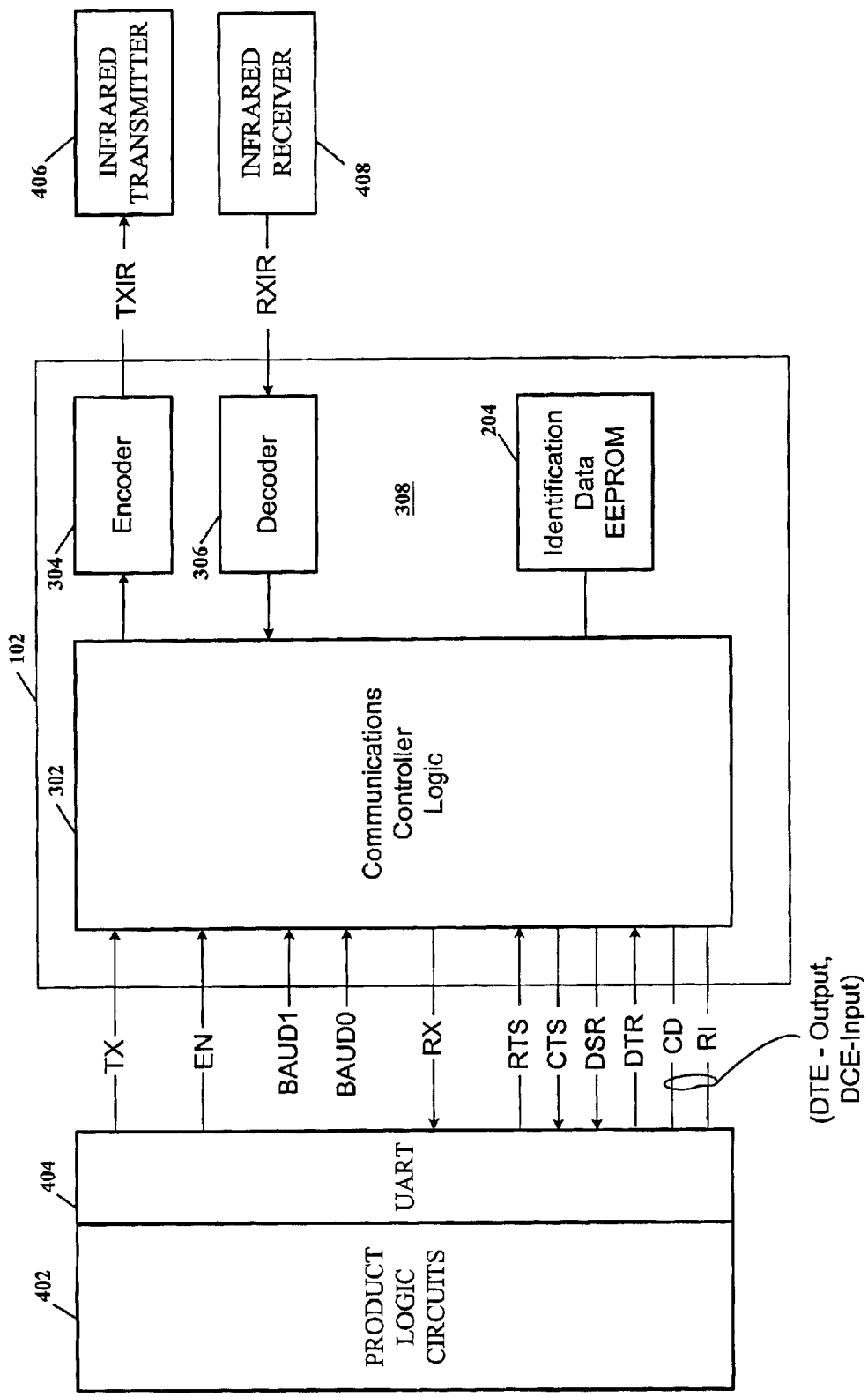
FIG. 4 illustrates a schematic functional block diagram of an IrDA compliant system comprising device logic circuits, the IrDA compliant communications controller depicted in FIG. 3 and an infrared transmitter and receiver.

Referring now to FIG. 4, a schematic functional block diagram of an IrDA compliant system comprising IrDA compliant device logic circuits 402 and a UART 404, the communications controller 102 depicted in FIG. 2, and an infrared transmitter 406 and an infrared receiver 408. The communications controller 102 is connected between the infrared transmitter 406 and receiver 408 (optical transceiver) and a device 106 (see FIG. 1) comprising the product logic circuits 402 and the UART 404. The product logic circuits 302 may be part of an IrDA compliant device, e.g., printer, video camera, PDA, wireless keyboard, wireless mouse, etc. The communications controller 102, in combination with the infrared transmitter 406 and receiver 408, gives the product IrDA compliant capabilities. The identification data EEPROM 204 supplies the communications controller 102 with the identification string (generic or unique).

The UART 404 sends transmit serial data (TX) to an input of the encoder 304. The encode 304 encodes the transmit serial data into transmit electrical pulses (TXIR) compatible with IR light transmission. The TXIR pulses are coupled to the IR transmitter 406 for transmission by IR light pulses. The BAUD rate of the light pulses is determined by the communication controller logic 302 (inputs BAUDI and BAUDO).

IR light pulses are received and by the IR optical receiver 408. These received IR light pulses are detected by the IR optical receiver 408 and converted into receive electrical pulses (RXIR) which are coupled to the decoder 306. The decoder 306 decodes the received electrical pulses (RXIR) into receive serial data (RX) and formats the receive serial data (RX) to the communications controller logic 302 which sends the RX signals to the UART 404.

The product logic circuits 402 may be any type of digital circuit having serial digital data communications capabilities, e.g., a microcomputer with a UART 404, a central processing unit (CPU) and UART, a reduced instruction set computer (RISC) or complex instruction set computer (CISC) and a UART, a digital signal processor with a UART, and the like.

The present invention may function so as to accommodate an infrared standard such as Infrared Data Association (IrDA) Serial Physical Layer Specification, version 1.3 (Oct. 15, 1998) and IrDA Control Specification, final revision (Jun. 30, 1998), both IrDA standards being incorporated by reference herein for all purposes.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A system for communications between two or more devices, said system comprising:

first device application logic adapted for sending transmit serial data at a serial clock rate and receiving receive serial data at the serial clock rate;

a first communications controller coupled to said first device application logic, said first communications controller encoding the transmit serial data and decoding the receive serial data on a communication circuit;

second device application logic adapted for receiving the transmit serial data at the serial clock rate and transmitting the receive serial data at the serial clock rate;

a second communications controller coupled to said second device application logic, said communications controller decoding the transmit serial data and encoding the receive serial data on the communication circuit;

said first and second communications controllers having a first programmable non-volatile memory for storing a first identification data string representative of the capabilities of the first device;

said second communications controllers having a second programmable non-volatile memory for storing a second identification data string representative of the capabilities of the second device; and wherein the first and second identification data strings are transmitted and received between the first and second devices over the communications circuit.

2. The system according to claim 1, wherein said first and second device application logic are selected from the group consisting of a microcontroller, a microprocessor, digital signal processor, a programmable logic array and an application specific integrated circuit.

3. The system according to claim 1, wherein said first and second device application logic comprises a central processing unit, a random access memory and a read only memory.

4. The system according to claim 1, further comprising:
 a first infrared transmitter and first encoder coupled to said first communications controller, wherein said first infrared transmitter and first encoder convert first transmit pulses from said first communications controller into first infrared light pulses;
 a second infrared transmitter and second encoder coupled to said second communications controller, wherein said second infrared transmitter and second encoder convert second transmit pulses from said second communications controller into second infrared light pulses;
 a first infrared receiver adapted for receiving the second infrared light pulses and converting the second infrared light pulses into first receive pulses;
 a second infrared receiver adapted for receiving the first infrared light pulses and converting the first infrared light pulses into second receive pulses;
 said first infrared receiver coupled to said first communications controller; and
 said second infrared receiver coupled to said second communications controller.

* * * * *